Feb. 5, 1946.  E. M. D. HEROLD ET AL  2,394,448
DRIVE COUPLING
Filed Nov. 30, 1942    2 Sheets-Sheet 2

INVENTORS
EDGAR M. D. HEROLD and
FRANK E. WALLING,
by: John E. Jackson
their Attorney.

Patented Feb. 5, 1946

2,394,448

UNITED STATES PATENT OFFICE 2,394,448

DRIVE COUPLING

Edgar M. D. Herold, Duquesne, and Frank E. Walling, Sewickley, Pa.

Application November 30, 1942, Serial No. 467,451

1 Claim. (Cl. 64—14)

This invention relates to drive couplings, and more particularly to those which are used in rolling mills to connect a pinion stand with the necks of the rolls, although not limited thereto.

In rolling mill design, it has long been the practice to connect the driving engine or motor with the necks of the power-driven metal-working rolls through a stand of pinions. Spindles are connected at their ends with the pinions and roll necks by means of coupling boxes. These coupling boxes comprise comparatively short cast metal cylinders provided on their inner surfaces with lugs which roughly fit correspondingly shaped grooves on the peripheries of the connecting male element such as the spindles, roll necks, etc.

The function of these coupling boxes is manifold. They transmit rotating forces and at the same time permit limited misalignment. They are easily assembled and disassembled by endwise slipping further onto their connecting male elements. In addition, they act as a breaking point in case of overload, and thus protect other and more costly parts of the rolling mill or drive therefor.

Due to the design of the coupling boxes and their connecting male elements, there is necessarily an appreciable amount of clearance at the points of bearing therebetween. In applying the load, or in reversing the direction of rotation, this clearance produces backlash, which is evidenced by considerable shock and wear, not only in the coupling boxes and connecting male elements themselves, but in the bearings, pinion gears, housings, etc.

It has been proposed to utilize coupling boxes of larger diameter with closer clearances provided by machined surfaces or renewable bronze or hardened steel wearing surfaces having increased areas combined with pressure lubrication. These features not only require space but are inherently costly.

It is among the objects of the present invention to provide a drive coupling which, while simple and inexpensive in design, is characterized by material reduction in clearances, thereby correspondingly reducing backlash with its accompanying deleterious shock and wear.

Another object is to provide a drive coupling of the class described which reduces wear on the cooperating elements by the provision of wear-resisting material which is so disposed as to reduce clearance.

Another object is the attainment of the immediately foregoing by the use of material as aforesaid which is also shock-absorbing in nature.

The invention, then, comprises the features hereinafter fully described and as particularly pointed out in the claim, the following description and the annexed drawings setting forth in detail certain illustrative embodiments of the invention, these being indicative or several of the number of ways in which the principles of the invention may be employed.

Figure 1:
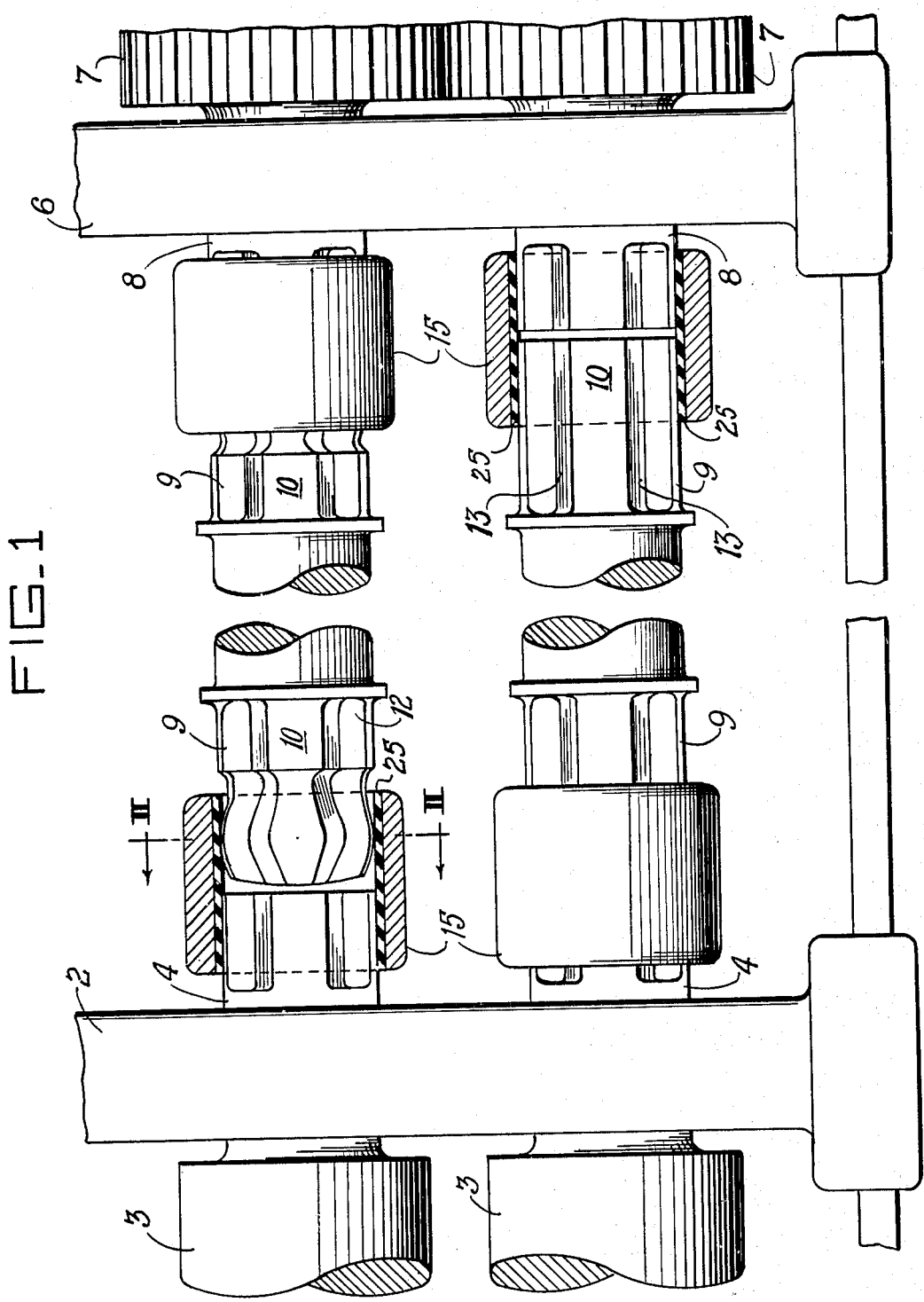
Figure 1 is a fragmentary side elevation, partly in section, illustrating a rolling mill and pinion stand embodying the device of the present invention.
Figure 2:
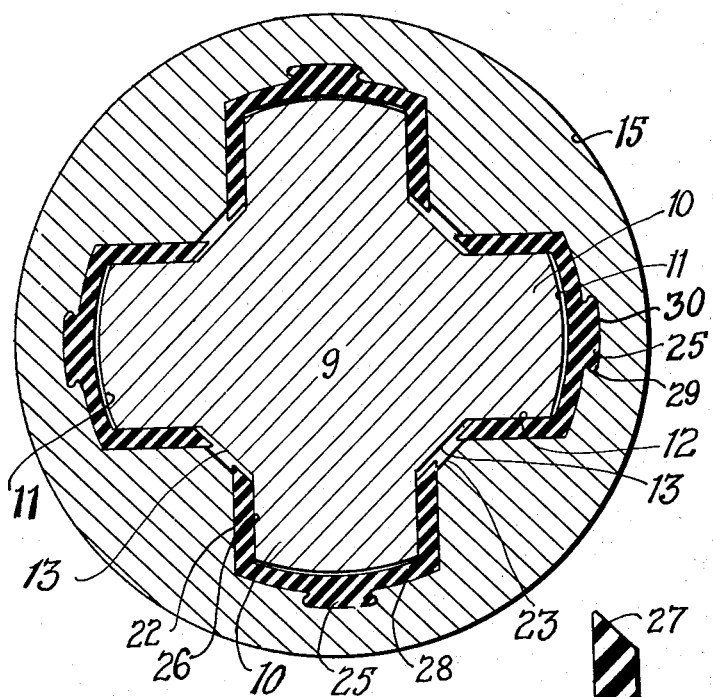
Figure 2 is an enlarged sectional view on the line II—II of Figure 1.
Figure 4:
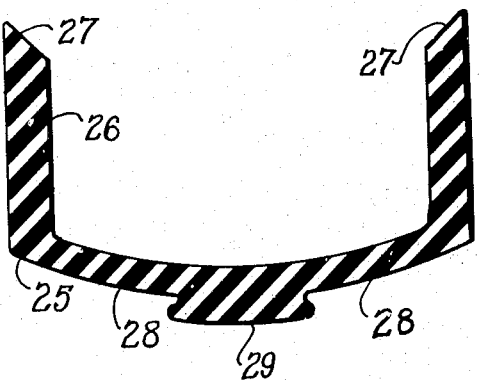
Figure 4 is an enlarged sectional elevation of a detail.

Referring more particularly to the drawings, the numeral 2 designates one side of a rolling mill housing within which there is journaled a pair of power-driven metal-working rolls 3, the necks 4 of which extend through and project from the housing 2 in the manner shown.

Disposed adjacent the rolling mill housing 2 is a pinion stand of which the numeral 6 designates one side of the housing thereof. Journaled within the housing 6 of the pinion stand is a pair of pinions 7, the driven shafts 8 of which extend through and project from the housing 6 aforesaid. The pinions 7 within the housing 6 of the pinion stand are driven in any suitable manner as, for example, by means of an adjacently disposed motor and driving connections (neither of which is shown).

Referring more particularly to Figure 1, the numeral 9 designates a pair of driving spindles which are used to connect the driven shafts 8 of the pinions 7 and the necks 4 of the rolls 3. Each of these driving spindles 9 comprises an elongate shaft at either end of which is a series of evenly spaced radially-projecting lugs 10, the other surfaces of which are of slightly convex curvature, as illustrated at 11. The sides of the radially-projecting lugs 10 are substantially flat, as indicated at 12. The inner ends of the substantially flat sides 12 of the adjacently disposed radially-extending lugs 10 are connected through substantially flat obliquely extending surfaces 13. That is to say, the substantially flat sides 12 of the radially-extending lugs 10 are disposed at substantial right angles with respect to each other, while the substantially flat obliquely extending surfaces 13 which connect each adjacent pair of sides (12) extend therefrom at approximate 45° angles.

Figure 3:
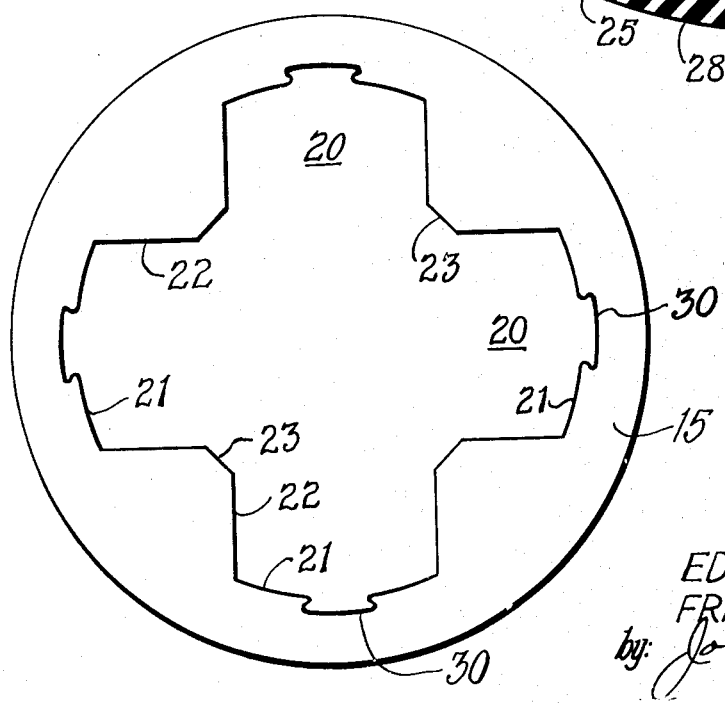
Figure 3 is an end elevation of the coupling box of the present invention.

As shown in Figure 3, the numeral 15 generally designates the coupling boxes which are used to connect the ends of the driving spindles 9 with their connecting male elements (on the one hand the driven shafts 8 of the pinions 7, and on the other hand the necks 4 of the rolls 3).

Each of these coupling boxes 15 comprises a comparatively short cylinder, the outer surface of which may be round. The interior of each of the coupling boxes 15 is contoured in a manner complementary to the surfaces 11, 12 and 13 of the ends of the driving spindles 9. That is to say, each of the coupling boxes 15 is provided at evenly spaced intervals with a series of grooves 20, the bottoms of which are transversely concave, as shown at 21, with the side walls in substantially flat parallelism with respect to each other, as designated at 22. The surfaces of the coupling boxes 15, which connect the adjacently disposed substantially flat side walls 22 of the grooves 20, are substantially flat and extend obliquely therefrom, as shown at 23, at angles of approximately 45°.

It is essential to the teachings of the present invention that the width and height of the lugs 10 of the driving spindles 9 be materially less than the width and depth of the grooves 20 of the coupling boxes 15; and that the flat and oblique surfaces 23 of the lugs 10 be disposed a considerably lesser distance from the axis of the driving spindles 9 than the correspondingly shaped and parallel surfaces 23 of the coupling boxes 15. In this manner, then, all of the surfaces of the driving spindles 9 are maintained in substantially spaced relationship with respect to the correspondingly shaped surfaces of the coupling boxes 15. While the foregoing description has applied only to the driving spindles 9, it will be understood that the same obtains with respect to the necks of the rolls 3 and the driven shafts 8 of the pinions 7.

Disposed within each of the grooves 20 of each of the coupling boxes 15 is a substantially channeled or U-shaped insert 25 which is composed of rubber or other suitable shock-absorbing and wear-resisting material. The side walls 26 of the inserts 25 are substantially flat, and lie between and in contact with the surfaces 12 and 22 of the lugs 10 and grooves 20 respectively. The outer ends of the side walls 26 of the inserts 25 extend slightly into the spaces between the flat and oblique surfaces 13 and 23 of the driving spindles 9 and coupling boxes 15 respectively, and are beveled as shown at 27. Generally stated, the bottoms 28 of the inserts 25 are concavo-convex to lie between and contact the transversely convex ends 11 of the lugs 10 and the correspondingly shaped transversely concave bottoms 21 of the grooves 20. Along the centers of their bottoms the inserts 25 are provided with longitudinally-extending dovetailed ribs 29 which seat in correspondingly shaped grooves 30 along the centers of the bottoms of the grooves 20. This dovetailed relationship maintains the inserts 25 in operative position.

The inserts 25 may be used either with or without fabric or other reinforcing binding or edging.

The provision of the shock-absorbing wear-resisting inserts 25 which lie between all driving surfaces of the lugs 10 and grooves 20 results in the material reduction of backlash and the corresponding reduction in shock and wear. This is particularly important in the case of reversing rolling mills wherein the direction of rotation is frequently changed. However, it will be understood that the combination of the present invention has equal application to non-reversible rolling mills and to all installations wherein drive couplings having some provision for misalignment are essential.

While we have shown and described certain specific embodiments of the present invention, it will be seen that we do not wish to be limited exactly thereto, since various modifications may be made without departing from the scope of the invention as defined in the appended claim.

We claim:

A driving coupling comprising a female element having a plurality of grooves therein extending the full length thereof, a male element provided with a series of radially extending lugs shaped to correspond with the grooves aforesaid and extending into one end of said female element, a second male element having similarly shaped lugs and extending into the other end of said female element, the surfaces of the grooves providing spaces between the corresponding surfaces of the lugs, and shock-absorbing and wear-resisting inserts disposed in said spaces and extending substantially the length of the grooves, each of said inserts being provided with a longitudinally-extending dovetailed rib, and each of said grooves being provided with a dovetailed groove extending the full length thereof for receiving said dovetailed rib to maintain said insert against displacement.

EDGAR M. D. HEROLD.
FRANK E. WALLING.

Certificate of Correction

Patent No. 2,394,448.

February 5, 1946.

EDGAR M. D. HEROLD ET AL.

It is hereby certified that errors appear in the printed specification of the above numbered patent requiring correction as follows: Page 1, second column, line 8, for "or several" read *of several*; page 2, second column, line 25, for "non-reversible" read *non-reversing*; and that the said Letters Patent should be read with these corrections therein that the same may conform to the record of the case in the Patent Office.

Signed and sealed this 23d day of April, A. D. 1946.

[SEAL]

LESLIE FRAZER,
*First Assistant Commissioner of Patents.*